United States Patent
Lee et al.

(10) Patent No.: US 6,952,514 B2
(45) Date of Patent: Oct. 4, 2005

(54) COUPLING STRUCTURE FOR OPTICAL WAVEGUIDE AND OPTICAL DEVICE AND OPTICAL ALIGNMENT METHOD BY USING THE SAME

(75) Inventors: Young-Min Lee, Yongin-shi (KR); June-Hyeon Ahn, Suwon-shi (KR); Kyu-Sub Kwak, Seoul (KR)

(73) Assignee: Samsung Electronics Co., LTD, Suwon-Si (KR)

( * ) Notice: Subject to any disclaimer, the term of this patent is extended or adjusted under 35 U.S.C. 154(b) by 0 days.

(21) Appl. No.: 10/683,373

(22) Filed: Oct. 10, 2003

(65) Prior Publication Data

US 2004/0264871 A1 Dec. 30, 2004

(30) Foreign Application Priority Data

Jun. 24, 2003 (KR) .............................. 10-2003-0041191

(51) Int. Cl.[7] .................................................. G02B 6/42
(52) U.S. Cl. ........................................... 385/52; 385/15
(58) Field of Search ..................................... 385/52, 15

(56) References Cited

U.S. PATENT DOCUMENTS 5,790,729 A * 8/1998 Pologe et al. ................. 385/46
6,654,523 B1 * 11/2003 Cole ............................. 385/52
2003/0128925 A1 * 7/2003 Wickman ..................... 385/37

* cited by examiner

Primary Examiner—Jennifer Doan
(74) Attorney, Agent, or Firm—Cha & Reiter, LLC.

(57) ABSTRACT

A coupling structure for coupling an optical waveguide and an optical device is provided. The coupling structure enables to precisely align the optical waveguide and the optical device so that an optical-alignment error can be reduced within a range of a few μm. The coupling structure includes a first substrate, at least one optical waveguide formed on the first substrate to transmit an optical signal, optical alignment dummy waveguides symmetrically aligned on the first substrate about the optical waveguide, a second substrate bonded to the first substrate, at least one optical device mounted on a bottom surface of the second substrate and optically connected to the optical waveguide, and optical-alignment patterns formed at the bottom surface of the second substrate corresponding to the optical alignment dummy waveguides, wherein an optical alignment for the optical waveguide and the optical device is achieved by aligning the optical alignment dummy waveguides with the optical-alignment patterns.

12 Claims, 6 Drawing Sheets

(a)

(b)

(a)

(b)

COUPLING STRUCTURE FOR OPTICAL WAVEGUIDE AND OPTICAL DEVICE AND OPTICAL ALIGNMENT METHOD BY USING THE SAME

CLAIM OF PRIORITY

This application claims priority to an application entitled "Coupling structure for optical waveguide and optical device and optical alignment method by using the same," filed in the Korean Intellectual Property Office on Jun. 24, 2003 and assigned Serial No. 2003-41191, the contents of which are hereby incorporated by reference.

BACKGROUND OF THE INVENTION

1. Field of the Invention

The present invention relates to an optical coupling between an optical transmission medium and an optical device. More particularly, the present invention relates to a coupling structure and an optical-alignment method of aligning the optical device to a planar lightwave circuit precisely by bonding the optical device to a substrate through a flip-chip bonding process.

2. Description of the Related Art

Due to the recent demand for data communications including audio and video signals in the Internet, the conventional communication system based on an electric signal is replaced with an optical communication system.

The optical communication involves converting an electric signal into light energy and then restoring light energy into the electric signal. To this end, an optical transmitter, an optical-transmission medium, and an optical receiver are utilized. A PLC (planar lightwave circuit) device is used mainly as the optical-transmission medium. An LD (laser diode) or a VCSEL (vertical cavity surface emitting laser) is used mainly as the optical transmitter. A semiconductor optical device, such as a PD (photo diode) is used mainly as the optical receiver.

A flip-chip bonding technique has been used typically in fabricating an electronic circuit requiring a small-size and a high-speed operation. Using the flip-chip bonding technique, the volume of an electronic circuit fabricated may be reduced to about 1/10 of the conventional ceramic-packaged integrated circuit. In addition, a design aspect of the electronic circuit can be simplified and the length of an electric connection wire can be shortened. Thus, it is advantageous for implementation in high-speed operation.

When fabricating an optical transmitter and an optical receiver, optical devices including the LD, VCSEL, and PD are coupled directly to the substrate in such a manner that the optical devices can be connected optically to an optical fiber. Further, the PLC may be aligned on the substrate by adopting a bonding technique similar to the flip-chip bonding technique. When coupling the optical-transmission medium, optical transmitter, and optical receiver optically with each other, coupling efficiency must be considered carefully as the coupling efficiency tends to be a main factor in obtaining an optimal performance of the optical-transmission medium, optical transmitter, and optical receiver. Accordingly, a precise optical alignment is highly desired.

FIGS. 1A to 1D are views showing a conventional alignment method between a VCSEL and a PLC.

As shown in FIG. 1A, a V-groove 3 is formed on a substrate 2 having a VCSEL 1 attached thereto. Then, a protrusion 5 corresponding to the V-groove 3 is formed on a pickup device 4 for picking up the substrate 2. The pickup device 4 picks up the substrate 2 in an arrow direction in such a manner that the protrusion 5 is positioned within the V-groove 3 (referred to FIG. 1B), thereby maintaining the VCSEL 1 and the V-groove 3 in a predetermined position. The substrate 2, which has been picked up by the pickup device 4, is inserted into a guide hole 8 formed in a package or an OSA 7 (optical sub-assembly 7 shown in FIG. 1C) through a guiding pin 6 attached to the pickup device 4, so that the substrate 2 can be attached to a predetermined portion of the OSA 7.

FIGS. 2A and 2B are views showing another conventional alignment method. FIG. 2A shows a guide hole 12 formed on an OSA (Optical Sub-Assembly) structure and a guiding pin 14 of a chip assembly block 13, which are aligned through a passive-alignment method. FIG. 2B is a front view of the chip assembly block 13 shown in FIG. 2A. Reference numerals 15 and 16 represent a PLC and a ferrule, respectively.

Operating the above conventional alignment, however, has the following disadvantages:

Firstly, the pickup device is large and requires a complex structure, and a plurality of pickup devices that corresponds to the sorts of substrates is also required. Next, since the V-groove is formed on an upper surface of the substrate, the size of a pattern or the mounting area formed on the substrate is reduced so that it is difficult to reduce the size of the substrate. Moreover, the guiding pin and the guide hole must be formed in the substrate and the package or the OSA, respectively, in order to mount the substrate on the package or the OSA. As such, it is required to precisely form the guide hole in the package or the OSA that in turn enlarges the size of the package or the OSA. For this reason, although the conventional alignment method can mount the substrate on the package or the OSA by picking up the substrate formed with the V-groove using the guiding pin, the structure of the pickup device, substrate, package, and OSA are complex and undesirably large. Furthermore, an output power band of a transceiver is increased due to a mechanical processing error according to the conventional method, so it is difficult to adjust the transmission characteristics as desired. In addition, since the level of the light received in a light-detecting device is not constant, it is difficult to adjust the sensitivity of the operating device. Lastly, in order to reduce the mechanical processing error in the main components, fabrication cost may be increased, and as a result, the price competitiveness of an article suffers.

SUMMARY OF THE INVENTION

Accordingly, the present invention has been made to solve the above-mentioned problems and provides additional advantages, by providing a coupling structure used in an optical waveguide and an optical device, and an optical-alignment method capable of precisely aligning the optical waveguide and the optical device in such a manner that an alignment error thereof is within a few μm.

In one embodiment, a coupling structure for an optical waveguide and an optical device is provided and includes: a first substrate; at least one optical waveguide formed on the first substrate in order to transmit an optical signal; optical alignment dummy waveguides symmetrically aligned on the first substrate about the optical waveguide; a second substrate bonded to the first substrate; at least one optical device mounted on a bottom surface of the second substrate in such a manner that the optical device is optically connected to the optical waveguide; and, optical alignment patterns formed at the bottom surface of the second substrate corresponding to the optical alignment dummy waveguides, wherein an optical alignment for the optical waveguide and the optical device is achieved by aligning the optical alignment dummy waveguides and the optical-alignment patterns.

According to the preferred embodiment of the present invention, a front surface of the second substrate is bonded to an upper surface of the first substrate. An active surface of the optical device faces the bottom surface of the second substrate, and a metal pad is provided at an edge of the active surface of the optical device.

According to the preferred embodiment of the present invention, a WDM filter is provided at a front surface of the second substrate corresponding to the active surfaces of the optical device so as to selectively pass or reflect light having a predetermined wavelength incident into or radiated from the optical device.

In another embodiment, an optical-alignment method for an optical coupling between an optical waveguide and an optical device is provided. The method includes the steps of: symmetrically forming optical alignment dummy waveguides on a substrate about the optical waveguide; symmetrically forming optical-alignment patterns on the substrate formed with the optical device about the optical waveguide; and, aligning the optical alignment dummy waveguides and optical-alignment patterns, thereby achieving an optical alignment between the optical waveguide and the optical device.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. For the purposes of clarity and simplicity, a detailed description of known functions and configurations incorporated herein will be omitted as it may make the subject matter of the present invention unclear.

Figure 1:
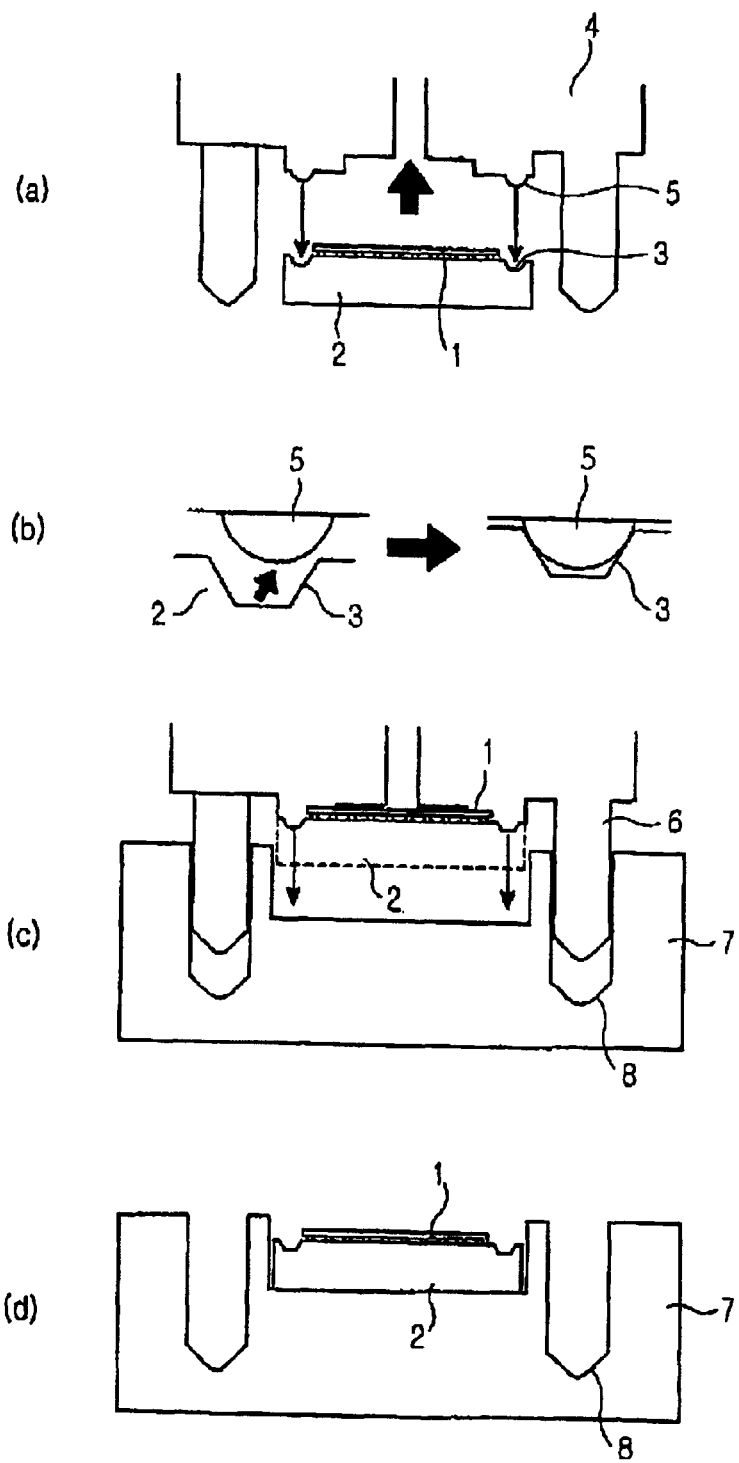
FIGS. 1A to 1D a reviews showing an example of a conventional alignment structure for a PLC and a VCSEL.
Figure 2:
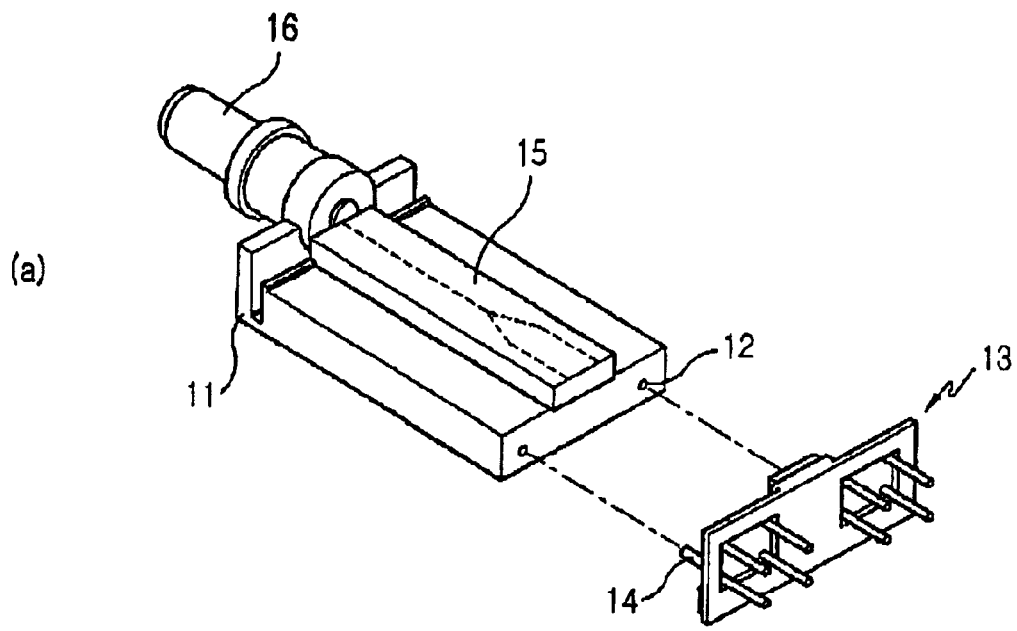
FIGS. 2A and 2B are views showing a conventional passive-alignment structure by using a guide hole and a guiding pin.
Figure 2:
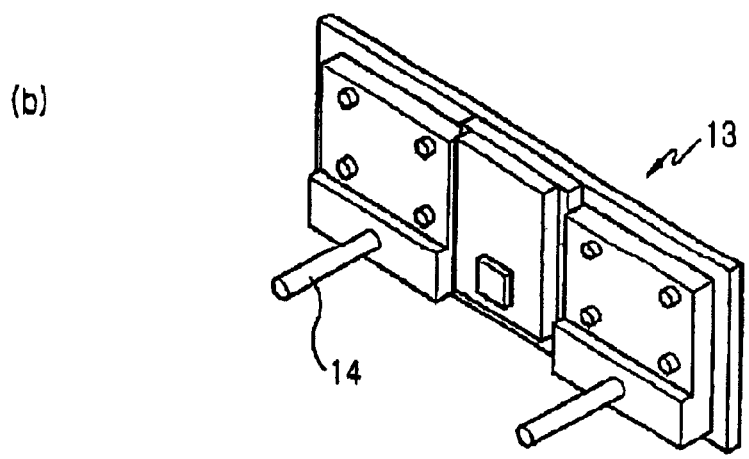
Figure 3:
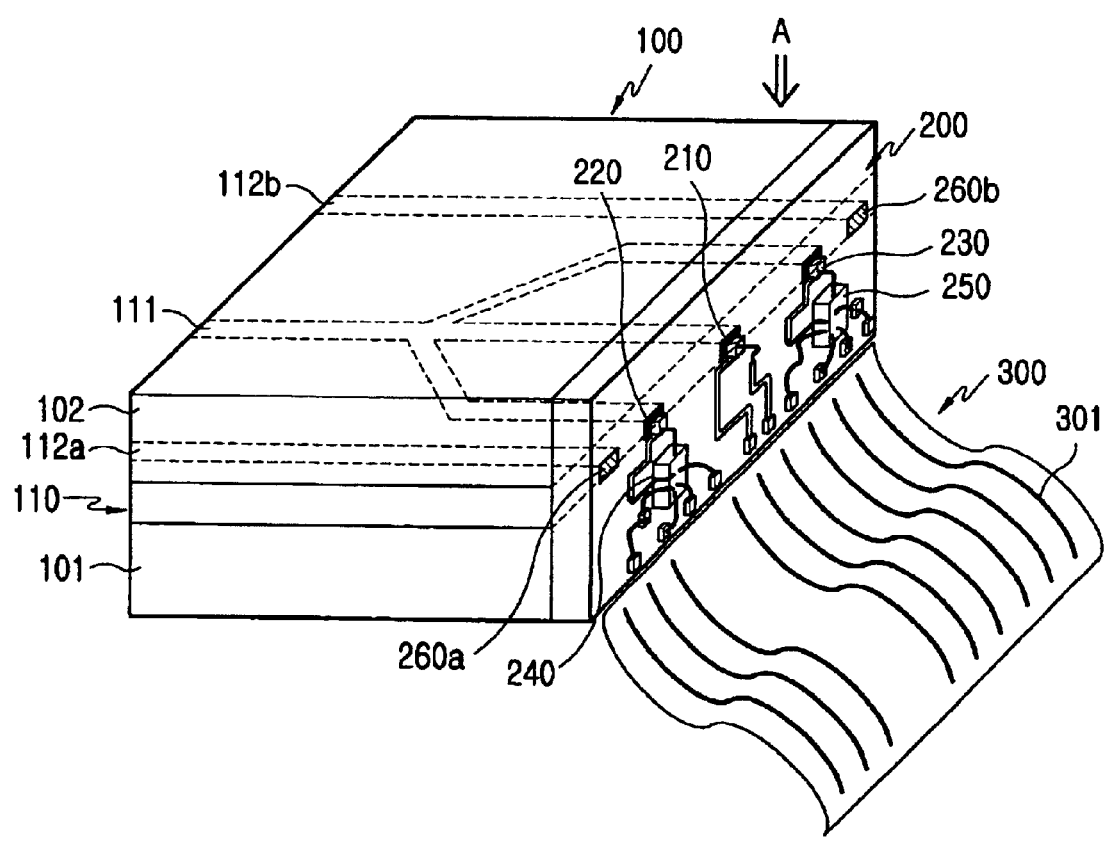
FIG. 3 is a view showing a coupling structure for an optical waveguide and an optical device according to a preferred embodiment of the present invention.

FIG. 3 is a view showing a coupling structure for an optical waveguide and an optical device according to an embodiment of the present invention. As shown, a glass substrate 200 provided with a VCSEL (vertical cavity surface emitting laser), a PD (photo diode), and a transimpedance amplifier is bonded to an OSA body 100 having a PLC (planar lightwave circuit) substrate 110 formed with an optical waveguide. Reference numerals 300 and 301 represent a flexible printed circuit board and a signal line, respectively.

The OSA body 100 includes a silicon substrate 101, a PLC layer 110, and a dummy glass substrate 102.

The PLC layer 110 includes an optical waveguide 111 for transmitting an optical signal, and dummy waveguides 112a and 112b used for an optical alignment when the PLC layer 110 is being bonded to the glass substrate 200.

Mounted on the glass substrate 200 are a VCSEL 210, which is a light-emitting device, and photo diodes 220 and 230, which are light-detecting devices. In addition, transimpedance amplifiers 240 and 250 are mounted on the glass substrate 200 to convert a current signal detected by the light-detecting devices into a voltage signal. The transimpedance amplifiers 240 and 250 are connected to the glass substrate 200 through a die-bonding process and connected to the photo diodes 220 and 230 through a wire-bonding process. In addition, the glass substrate 200 includes optical alignment dummy patterns 260a and 260b. Note that in place of the glass substrate 200, other substrates known as artisans, which does not absorb wavelengths, can be used.

Figure 4:
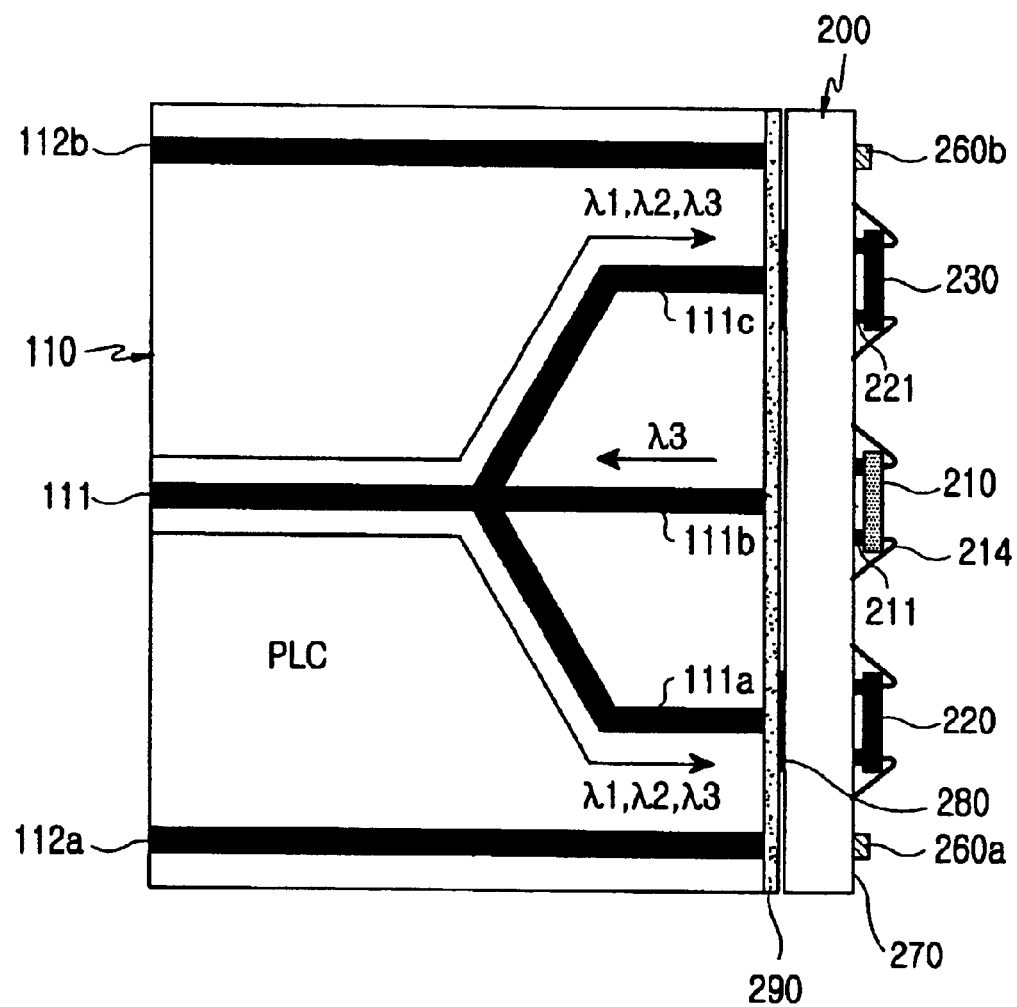
FIG. 4 is a planar view of a coupling structure shown FIG. 3 for representing a set-top-box.

FIG. 4 is a planar view of the coupling structure shown in FIG. 3, representing a part of optical coupling structure, incorporated in VCSEL BiDi Transceiver for STB, and aligning the PLC layer 110 and the glass substrate 200. Reference numerals 211 and 221 represent metal pads, and reference numeral 214 represents a wire bonding part.

Referring to FIGS. 3 and 4, the PLC substrate 110 includes the optical waveguide 111 having three branch lines 111a, 111b, and 111c, and the dummy waveguides 112a and 112b symmetrically aligned about the optical waveguide 111 for use in an optical alignment.

Figure 5:
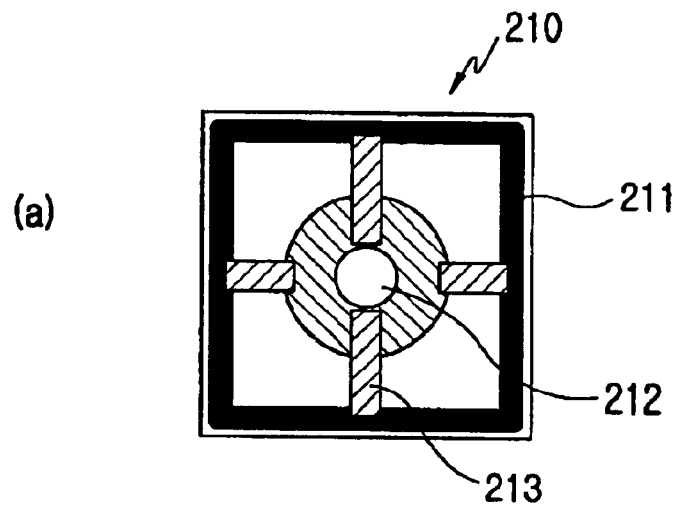
FIGS. 5A and 5B are detailed views showing active surfaces of a VCSEL and a PD; and, FIG. 6 is a planar view of a coupling structure shown in FIG. 3 for representing an optical network unit.
Figure 5:
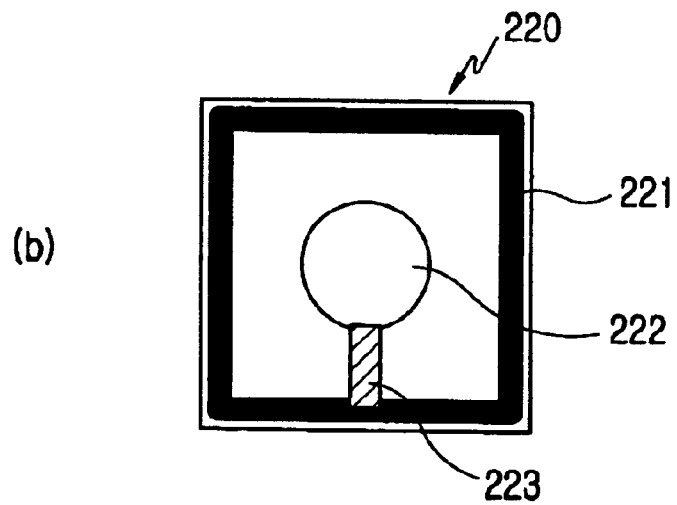

An anti-reflection coating layer 270 is formed at the bottom surface of the glass substrate 200. The VCSEL 210 and photo diodes 220 and 230 are mounted on the anti-reflection coating layer 270 through a flip-chip bonding process in such a manner that the active surfaces of the VCSEL 210 and photo diodes 220 and 230 face the glass substrate 200. In order to facilitate the bonding process, as shown in FIG. 5, metal pads 211 and 221 are formed at the edges of the VCSEL 210 and photo diodes 220 and 230.

FIGS. 5A and 5B are detailed views showing active surfaces of the VCSEL and the photo diodes. FIG. 5A shows the active surface (front surface) of the VCSEL and FIG. 5B shows the active surface (front surface) of the photo diodes. Reference numerals 212 and 222 represent windows, and reference numerals 213 and 223 represent Au-patterned parts. Although it is not illustrated, rear surfaces of the VCSEL and the photo diodes are coated with Au.

Referring back to FIG. 4, the optical alignment dummy patterns 260a and 260b are aligned at both sides of the photo diodes 220 and 230 and include a metal-thin film or a dielectric-thin film. The optical coupling between the optical device and the optical waveguide 111 is carried out by using the optical alignment dummy patterns 260a and 260b and dummy waveguides 112a and 112b formed on the PLC layer 110, as follows.

The light passing through 112a and 112b is aligned with the 260a and 260b during the alignment process. Then, the PLC substrate 110 is bonded to the glass substrate 200 by means of ultraviolet ray and epoxy 290.

A WDM filter 280 is provided at a predetermined front surface of the glass substrate 200, which is a part bonded to the PLC layer 110, corresponding to the active surfaces of the photo diodes 220 and 230 in order to allow an optical signal having a predetermined wavelength and incident into the photo diodes 220 and 230 to pass therethrough or in order to reflect the optical signal therefrom. The WDM filter 280 can be adopted to a triplexer. In addition, the WDM filter 280 can be formed through a conventional thin-film process.

Figure 6:
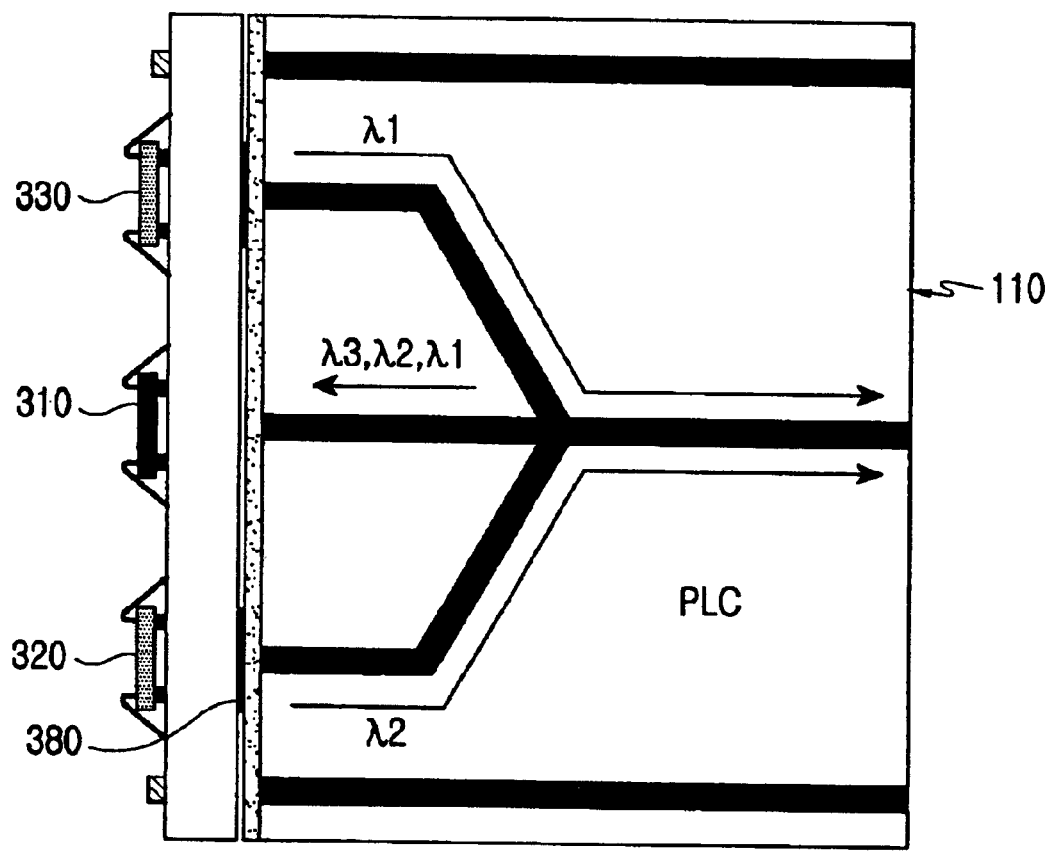

FIG. 6 is a view showing a part of opticalcoupling structure for ONU(optical network unit) and aligning the PLC layer 110 and the glass substrate 200. FIG. 6 is similar to FIG. 4 showing the STB structure except for the structure of the optical device mounted on the glass substrate and the WDM filter corresponding to the optical device. Thus, only different parts will be explained below in order to avoid redundancy.

Referring to FIG. 6, a photo diode 310 and two VCSELs 320 and 330 are mounted on a bottom surface of the glass substrate 200. In the same manner with the VCSEL 210 and photo diodes 220 and 230 shown in FIG. 4, the photo diode 310 and two VCSELs 320 and 330 are bonded to the glass substrate 200 through the flip-chip bonding process in such a manner that active surfaces of the photo diode 310 and two VCSELs 320 and 330 face the glass substrate 200.

In addition, a WDM filter 380 is provided at a predetermined front surface of the glass substrate 200, which is a part bonded to the PLC layer 110, corresponding to the active surfaces of two VCSELs 320 and 330 in order to allow an optical signal radiated from two VCSELs 320 and 330 with a predetermined wavelength to pass therethrough or in order to reflect the optical signal therefrom. The WDM filter 380 can be adopted to a triplexer. In addition, the WDM filter 280 can be formed through a conventional thin-film process.

As described above, according to the present invention, dummy waveguides and optical alignment patterns are aligned on an upper surface of the glass substrate, on which the PLC substrate and the optical device are mounted, so as to optically align the optical waveguide and the optical device. Accordingly, an optical-alignment error can be reduced using this method within a range of a few $\mu$m when carrying out the coupling of the optical waveguide to the optical device. In addition, the glass substrate is bonded to the PLC substrate through the flip-chip bonding process after mounting the optical device on the glass substrate, so that the distance between the PLC substrate and the optical device is constantly maintained, thereby improving coupling efficiency.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for coupling an optical waveguide and an optical device, comprising:
    a first substrate;
    at least one optical waveguide formed on the first substrate for transmission of an optical signal;
    dummy waveguides symmetrically provided on the first substrate about the optical waveguide;
    a second substrate coupled to the first substrate;
    at least one optical device mounted on a bottom surface of the second substrate so that the optical device is connected optically to the optical waveguide; and,
    optical-alignment patterns formed at the bottom surface of the second substrate corresponding to the dummy waveguides, wherein an optical alignment of the optical waveguide and the optical device is achieved by aligning the dummy waveguides with the optical-alignment patterns.

2. The coupling structure as claimed in claim 1, wherein a front surface of the second substrate is bonded to an upper surface of the first substrate.

3. The coupling structure as claimed in claim 1, wherein the optical device is bonded to the second substrate through a flip-chip bonding process in such a manner that an active surface of the optical device faces the bottom surface of the second substrate.

4. The coupling structure as claimed in claim 3, further comprising a metal pad provided at an edge of the active surface of the optical device to facilitate the flip-chip bonding process.

5. The coupling structure as claimed in claim 1, wherein the optical waveguide includes at least three branch lines.

6. The coupling structure as claimed in claim 5, further comprising an optical-detecting device and at least two VCSELs mounted on the bottom surface of the second substrate so that the optical-detecting device and the VCSELs are connected to the branch lines of the optical waveguide.

7. The coupling structure as claimed in claim 6, further comprising a WDM filter provided at a front surface of the second substrate corresponding to the active surfaces of the VCSELs so as to selectively pass or reflect light having a predetermined wavelength radiated from or to the VCSELs.

8. The coupling structure as claimed in claim 5, further comprising a first optical-detecting device, a second optical-detecting device, and a VCSEL mounted on the bottom surface of the second substrate so that the first and second optical-detecting devices and the VCSEL are connected to three branch lines of the optical waveguide.

9. The coupling structure as claimed in claim 8, further comprising a WDM filter provided at a front surface of the second substrate corresponding to the active surfaces of the first and second optical-detecting devices so as to selectively pass or reflect light having a predetermined wavelength incident into the first and second optical-detecting devices.

10. The coupling structure as claimed in claim 7, wherein the WDM filter includes a thin-film filter fabricated through a thin-film coating process.

11. The coupling structure as claimed in claim 1, wherein the optical-alignment patterns include a metal-thin film or a dielectric-thin film.

12. An optical-alignment method for coupling an optical waveguide and an optical device, the method comprising the steps of:
    symmetrically forming dummy waveguides on a first substrate having the optical waveguide;
    symmetrically forming optical-alignment patterns on a second substrate and providing the optical device mounted on a bottom of the second substrate so that the optical device is connected optically to the optical waveguide; and,
    aligning the dummy waveguides and optical-alignment patterns using light signal transmitted via the dummy waveguides onto the optical-alignment patterns.

* * * * *